United States Patent
Friel (10) Patent No.: US 9,516,304 B2
(45) Date of Patent: Dec. 6, 2016

(54) SYSTEM AND METHOD FOR IMPROVED OPTICAL CHARACTER RECOGNITION FOR AUTOMATED SET-TOP BOX TESTING

(75) Inventor: Liam Friel, Bray (IE)

(73) Assignee: Accenture Global Solutions Limited, Dublin (IE)

(*) Notice: Subject to any disclaimer, the term of this patent is extended or adjusted under 35 U.S.C. 154(b) by 263 days.

(21) Appl. No.: 13/989,777

(22) PCT Filed: Dec. 22, 2011

(86) PCT No.: PCT/EP2011/073802
§ 371 (c)(1),
(2), (4) Date: Sep. 13, 2013

(87) PCT Pub. No.: WO2012/069662
PCT Pub. Date: May 31, 2012

(65) Prior Publication Data
US 2013/0347050 A1  Dec. 26, 2013

(30) Foreign Application Priority Data
Nov. 26, 2010 (GB) .................................. 1020101.0

(51) Int. Cl.
*H04N 7/173* (2011.01)
*G06K 9/18* (2006.01)
*H04N 17/04* (2006.01)
*H04N 17/00* (2006.01)

(52) U.S. Cl.
CPC .......... *H04N 17/045* (2013.01); *H04N 17/00* (2013.01)

(58) Field of Classification Search
USPC ........................................................ 725/107
See application file for complete search history.

(56) References Cited

U.S. PATENT DOCUMENTS

| | | | | |
|---|---|---|---|---|
| 5,262,860 | A * | 11/1993 | Fitzpatrick et al. | 348/461 |
| 5,647,023 | A * | 7/1997 | Agazzi | G06K 9/342 |
| | | | | 382/209 |
| 5,805,747 | A * | 9/1998 | Bradford | G06K 9/6292 |
| | | | | 382/185 |
| 6,295,387 | B1 * | 9/2001 | Burch | G06K 9/033 |
| | | | | 382/311 |
| 6,658,662 | B1 * | 12/2003 | Nielsen | 725/109 |
| 6,731,788 | B1 | 5/2004 | Agnihotri et al. | |
| 7,664,317 | B1 * | 2/2010 | Sowerby | 382/162 |
| 7,995,097 | B2 * | 8/2011 | Tzur et al. | 348/155 |
| 8,386,121 | B1 * | 2/2013 | Simon | G01M 15/02 |
| | | | | 701/29.1 |
| 2004/0017944 | A1 * | 1/2004 | Ding | G06K 9/4609 |
| | | | | 382/182 |
| 2006/0171588 | A1 * | 8/2006 | Chellapilla | G06K 9/6828 |
| | | | | 382/185 |
| 2006/0182311 | A1 * | 8/2006 | Lev | 382/103 |
| 2007/0047819 | A1 * | 3/2007 | Hull et al. | 382/190 |

(Continued)

FOREIGN PATENT DOCUMENTS

CN   101571922   11/2009

*Primary Examiner* — Mushfikh Alam
(74) *Attorney, Agent, or Firm* — Harrity & Harrity, LLP (57) ABSTRACT

The present application provides a user configurable test system for set-top boxes (STB) and other consumer devices providing video output. In particular, it provides for a method of improving an Optical Character Recognition (OCR) process in such test systems.

19 Claims, 5 Drawing Sheets

(56) References Cited

U.S. PATENT DOCUMENTS

| | | |
|---|---|---|
| 2007/0175998 A1 | 8/2007 | Lev |
| 2008/0068503 A1* | 3/2008 | Monji .......................... 348/563 |
| 2008/0118162 A1 | 5/2008 | Siegemund |
| 2011/0064304 A1* | 3/2011 | Xiao .................... G06K 9/2054 |
| | | 382/165 |
| 2011/0103688 A1* | 5/2011 | Urbschat .................. G06K 9/03 |
| | | 382/182 |
| 2012/0020563 A1* | 1/2012 | Amir et al. .................... 382/182 |
| 2012/0127522 A1* | 5/2012 | Uchiyama .......... H04N 1/00244 |
| | | 358/1.15 |
| 2012/0140081 A1* | 6/2012 | Clements .............. H04N 17/04 |
| | | 348/181 |
| 2012/0162440 A1* | 6/2012 | Wu ...................... H04N 17/004 |
| | | 348/181 |

* cited by examiner

SYSTEM AND METHOD FOR IMPROVED OPTICAL CHARACTER RECOGNITION FOR AUTOMATED SET-TOP BOX TESTING

FIELD

The present application pertains generally to the automated testing of set-top boxes (STB) and other audio visual equipment.

BACKGROUND

A set-top box (STB) also known as a digibox or set-top unit (STU) is a device that connects to a television and an external source of signal, turning the signal into content which may then be delivered as an Audiovisual (A/V) signal for display on the television screen or other A/V device. Most frequently, the external source of signal is provided by a satellite or cable connection.

Figure 1:
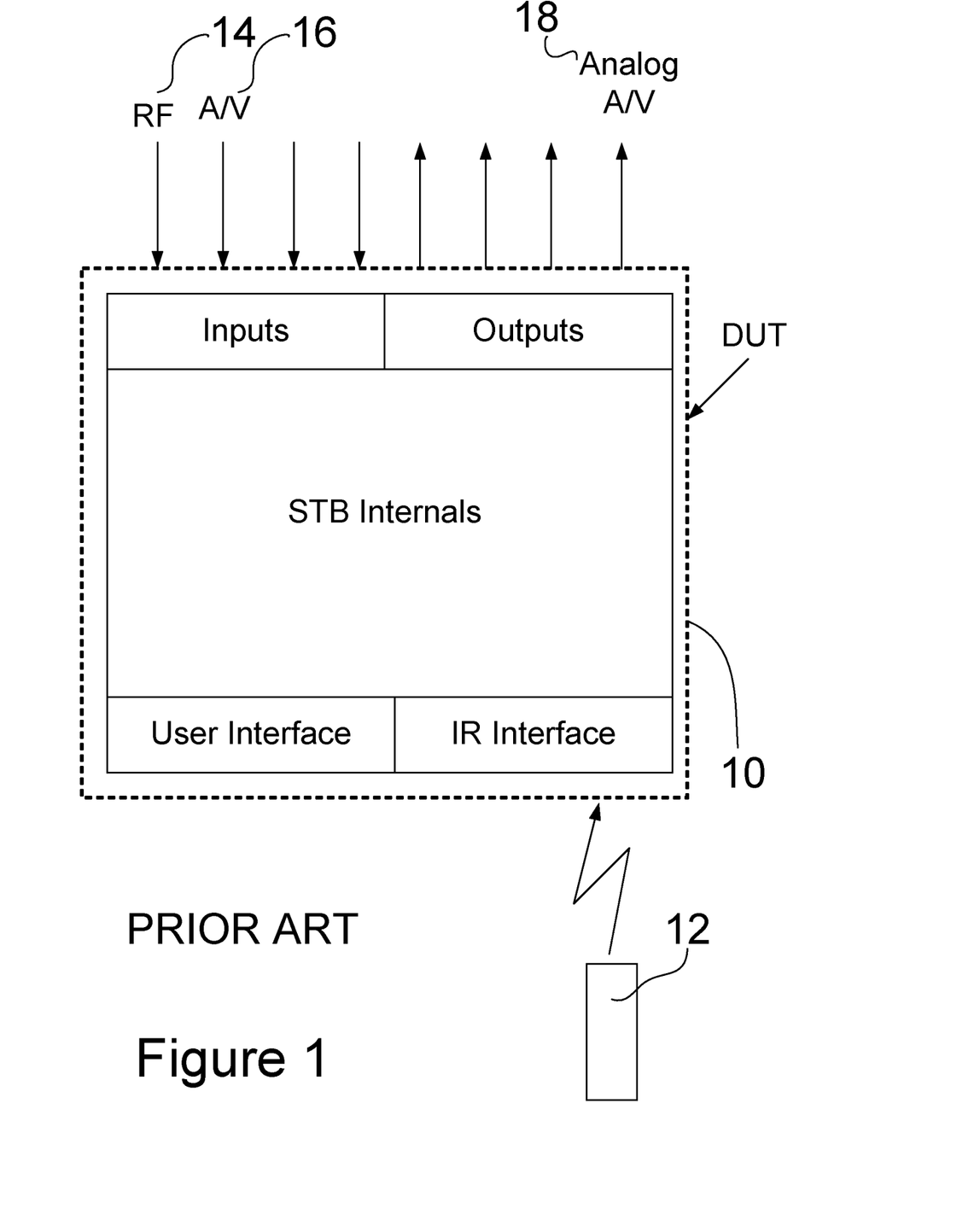
FIG. 1 is an illustration of an exemplary STB known in the art.

As with other consumer products, both manufacturers and suppliers are keen to ensure that products operate correctly and as specified. Initially and to this day, a significant part of the testing is performed manually, whereby a tester issues a command to the STB which may be via the user interface on the STB itself or via a remote control device as illustrated in FIG. 1, and observes the response of the STB on a TV display. As is shown in FIG. 1, a typical STB 10 has a number of signal inputs including an RF signal 14, which may for example be from a satellite or cable connection. An A/V signal 16 may also be provided as input allowing the set-top box to feed through a signal to a television from a VCR, DVD, Blu-ray disc, Media Juke Box or other similar device. The output to the television is an A/V signal 18 which may be provided over a variety of standard interfaces including SCART and HDMI. To allow the user control the operation of the STB, a number of buttons and similar controls may be provided on the STB itself. Additionally and more commonly employed by users, the STB may have an infra red (IR) or wireless remote control input configured to operate with a remote control device 12.

Figure 2:
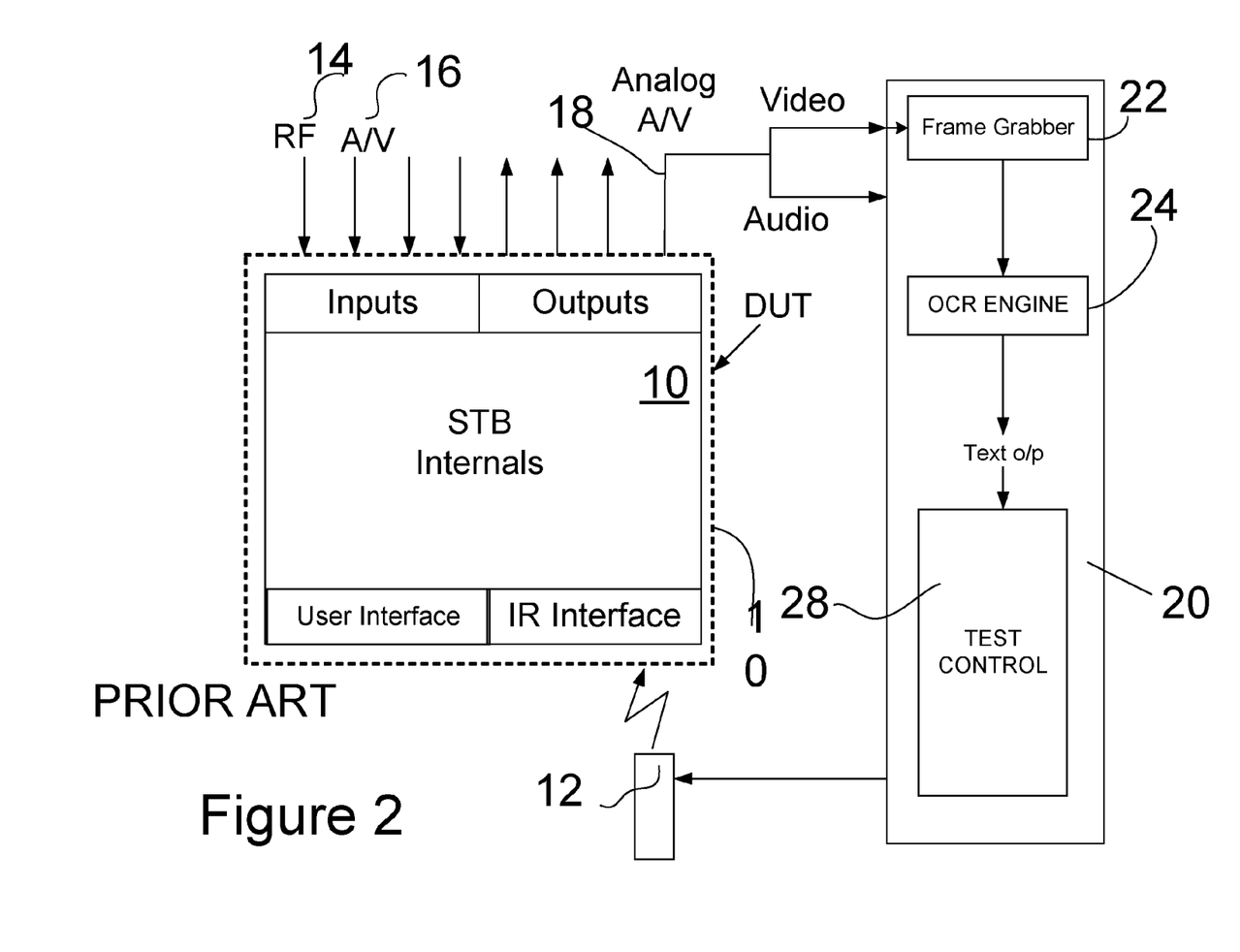
FIG. 2 is an illustration of a conventional prior art STB test system having OCR.

As manual testing can be time consuming, prone to error and in some instances lacking accuracy, an effort has been made to automate some of these tests. In respect of these automated tests, it will be appreciated that this testing is typically performed on the end product by users without necessarily any detailed knowledge or access to the internal circuitry of the STB. Accordingly, the testing of STB's is generally performed on a "black-box" basis, where only the inputs and outputs are available for modification and examination. Accordingly test methods and systems have been developed specifically for set top boxes, an example of such a system is StormTest™ provided by the S3 Group of Dublin, Ireland which may be employed to test STBs, televisions, and similar devices such as digital media players. An arrangement for a STB test system is shown in FIG. 2. The STB test system 20 comprises a controller 28 which manages the test function and interacts with the other features of the STB test system. The other features include an output interface for controlling a remote control device 12, allowing commands to be sent to the STB and an input interface for receiving the video and/or audio signals from the STB 10. This input interface may include an audio capture device 24 for accepting the audio as a test signal and/or a frame grabber 22 or similar device for accepting the video frames from the STB. The data captured is then made available to a processor for analysis, which in turn produces a test result and provides this to a user. Thus during a typical test, the Test System issues a command or sequence of commands to the STB, suitably via the remote control interface. Each frame of video and/or the audio is captured and made to available to the Test System for analysis of the STB response to the commands issued to it.

Typically, tests might include the generation of a "change channel" command to the STB followed by analysis of the audio and/or video outputs to ensure that the channel change command was correctly received and executed by the STB.

Set-top boxes are complex devices containing a main powerful embedded CPU and various peripheral devices. They generally run a sophisticated operating system (e.g. Linux, or VxWorks) and perform complex functions, and run a large and complex software stack on that operating system. These devices generally present to the users a sophisticated graphical user interface with on-screen menus and graphics. Automation of the testing typically involves, amongst other areas, optical character recognition (OCR) to read text from the screen and compare it with known or expected value, to determine if the user interface presented to the user is as expected.

As shown in FIG. 2, OCR may be performed on a captured frame or a section of a frame. Typically, in configuring a test routine, the person configuring the test will identify the section of the frame where text is to be found. The person may also configure the test by defining the expected result from the OCR process. The expected result may be a pre-determined known value or it may obtained elsewhere in the test routine. Additionally, the OCR process may be employed to obtain and store information from the device under test. OCR is generally performed by a software component known as an "OCR Engine". There are several OCR engines (software product) generally available for this purpose, i.e. the engines can process images and extract text from them. However, there are several practical difficulties in using an OCR engine in the context of a frame captured from a STB or device with a display, e.g. a digital television. One of the reasons for this is that OCR engines conventionally come from the document processing area, which has several differences to images captured from a video stream. The resolution of document scanners used to capture document images is generally much greater than the resolution of images, even high definition images, captured from video.

Documents generally have a fixed foreground/background contrast pattern: generally dark text on a light background. In addition, the contrast for a given document page is not variable. Once the OCR engine has determined the foreground and background colours for a page, this will not change. Thus for example it is known to use filters to optimise an OCR engine, for example where the page colour is not white. However contrast on modern dynamic user interfaces can be highly variable. As an example, transparent panes in the user interface are commonplace and thus the contrast of the text will vary as the background television program changes. To make matters worse, images captured from video streams can be quite noisy. As a result, the present inventor's experience has been that the accuracy of a typical OCR engine when employed with captured video may only be in the region of 65-90%.

It would be beneficial to improve the performance of OCR engines in analysing video images.

SUMMARY

In particular, the present application provides systems and methods in accordance with the claims which follow.

DESCRIPTION OF DRAWINGS

The present application will now be described with reference to the accompanying drawings in which.

DETAILED DESCRIPTION

The present application is based on the premise that developing an OCR engine specifically for captured video images may be a costly and time consuming process. Instead, it is desirable to provide a method that improves the performance of existing OCR engines, for example which are intended for scanned documents.

The present application improves the performance of OCR engines on captured video frames or sections thereof. The improvement is obtained by pre-processing the image (the captured frame or a part thereof) before submission to the OCR engine. In particular, it has been found by the present inventor that by processing an image with an image filter, the performance of the OCR engine may be improved. The difficulty is that whilst certain image filters may work perfectly in certain situations they may result in worse performance in others.

An exemplary test system for testing a STB may generally employ the known STB test system of FIG. 2 and thus include a first interface for controlling the operation of a set-top box, for example by sending commands to the STB via an IR remote control. Although, it will be appreciated that other control inputs/interfaces may be employed for example a direct serial connection may be employed if the STB has such an interface available. It will be appreciated that an interface employed to control the STB is commonly employed in conventional test systems for STB's and thus their design and operation would be readily understood and familiar to those skilled in the art. The test system is configured to analyse video from the STB along with other outputs including for example audio.

Specifically a second interface is employed to acquire one or more outputs from the STB. This second interface may include a frame grabber for capturing the video frames from the STB and/or an analog to digital converter for capturing the audio output from the STB. It will be appreciated that the technology associated with these elements would also be familiar to those skilled in the art. However, suitably the frame grabber is synchronised to the video frame timing allowing it to capture one complete video frame at a time. It will be appreciated that where a digital output is available from the set-top box, the requirement for an analog frame grabber/audio capture device may be obviated and replaced by a digital interface which directly captures the video frames being transmitted. Where the device under test has an integrated display for displaying the video, the video may be captured using a video camera directed at the display. As with existing systems, the system may select a particular region of interest from the frame. The region of interest would typically be pre-defined during the configuration\setting up process of a test routine.

Figure 3:
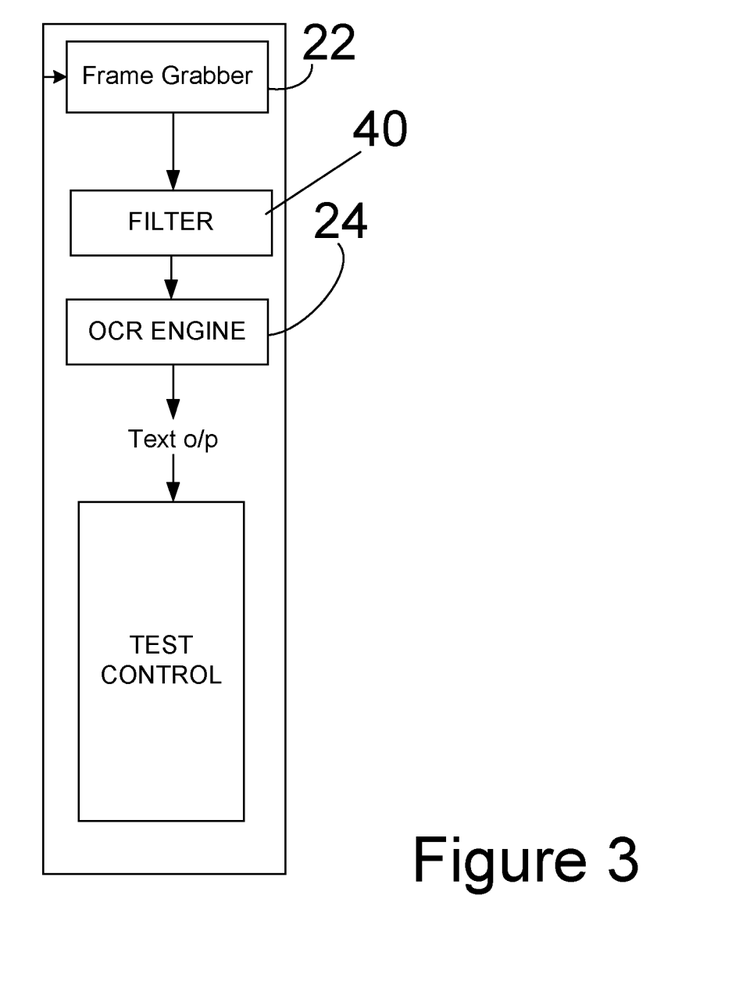
FIG. 3 is a block diagram of an aspect of STB test system according to an embodiment of the present application.

In the exemplary embodiment illustrated in FIG. 3 it may be seen that the frame capture and OCR engine\processes are unchanged and instead an image processor (filter) 40 is provided to pre-filter the image (which as explained above may either be the entire captured frame or more likely a pre-selected section of the captured frame) before processing by the OCR engine to extract text from the image.

The filter of the image processor 40 is a configurable filter such that the filter function applied to the image may be varied by the system. More specifically, the configuration for the filter for an image at a particular point in a test routine is suitably pre-set during an initial set-up configuration process where the test routine performed by the test system is prepared.

Figure 4:
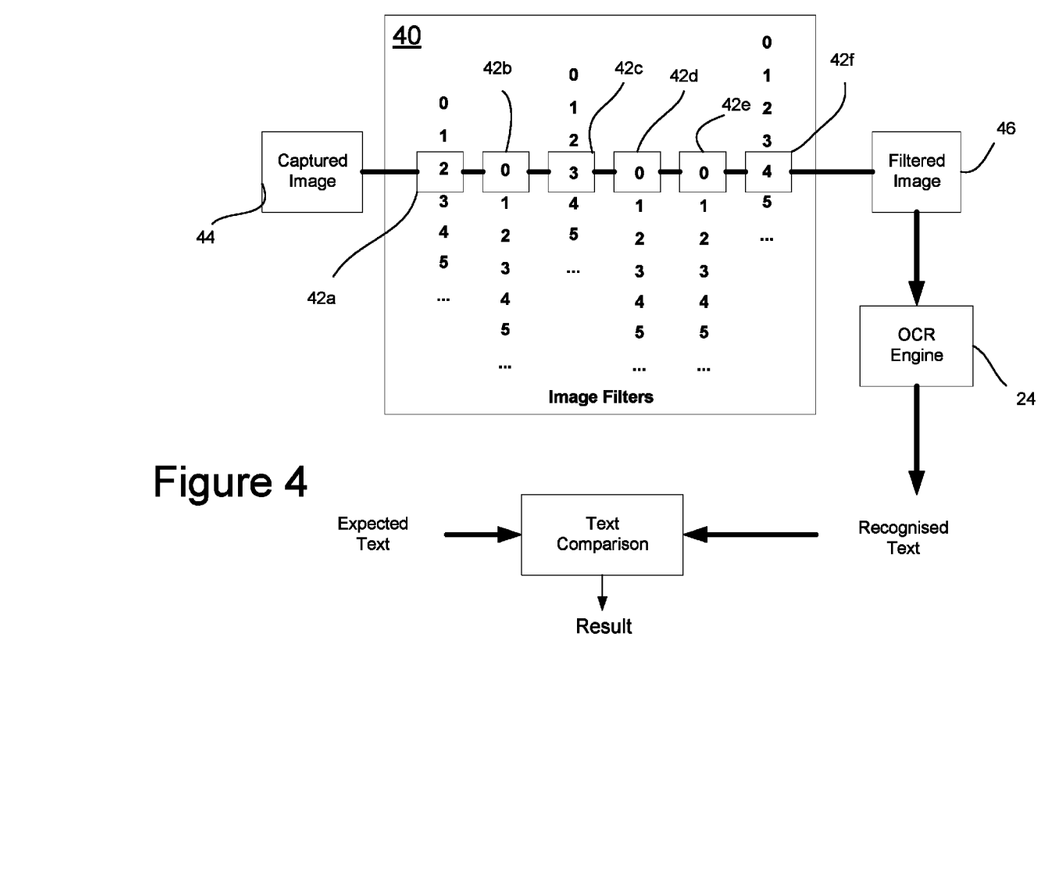
FIG. 4 illustrates an exemplary arrangement for selecting a filter configuration according to another embodiment.

The mode of operation will now be explained with reference to the method of determination of a configuration for the configurable filter as shown in FIG. 4 in which the configurable filter 40 comprises a sequence of different image filters 42a-f which may be applied sequentially to an image 44 from a captured frame or part thereof. As will be appreciated from the explanation which follows, each of the filters in the sequence may or may not be used to filter the image. Thus, the overall filter may be configured by the selection of which particular filters to use. Additionally, each filter may be configurable by one or more parameters (shown by the numerals 0-5 for each filter), which adjust the filter characteristics. One of these parameters, e.g. 0 may indicate that the filter is not be used. After filtering has been completed, the filtered image is passed to the OCR engine 24 for processing, where the recognised text may be compared with an expected result to determine the success or not of a particular test. In certain circumstances, there may not be an expected result and in this case, the result may simply be stored for reference or use subsequently in the test routine. This same routine may also be employed in the process to determine the filter configuration as described in greater detail below.

As examples, the following image filters have been determined to improve the accurate detection of text by the OCR engine when operating on colour images:

Selectively removing one or more colour components from the original image, with or without conversion to greyscale of the resulting image.

Adjusting image contrast

Inverting the colours in the image

Blurring the image

Sharpening the image

Zooming the image so that it is scaled up, interpolating pixels from the original image to create the new image.

It will be appreciated that whilst each of these may be regarded as an image filter. It will be appreciated that a general parameter for a filter may be whether it is employed or not. A specific parameter in the case of removing one or more colour components would be the colour components to be removed, thus in the case of a RGB (Red Green Blue) image, the filter configurations might be removal of:

a) R
b) G
c) B
d) RG
e) RB
f) GB

In the case of adjusting image contrast, an individual parameter might be whether to increase or decrease the contrast or the amount of contrast adjustment. Similarly, in the case of blurring or sharpening the degree of blurring or sharpening would be an individual filter parameter. In the case of an image filter for "zooming" the image so that it is scaled up, individual parameters may be the degree of scaling and/or the selection of a particular type of interpolation e.g. bi-cubic, linear etc.

Figure 5:
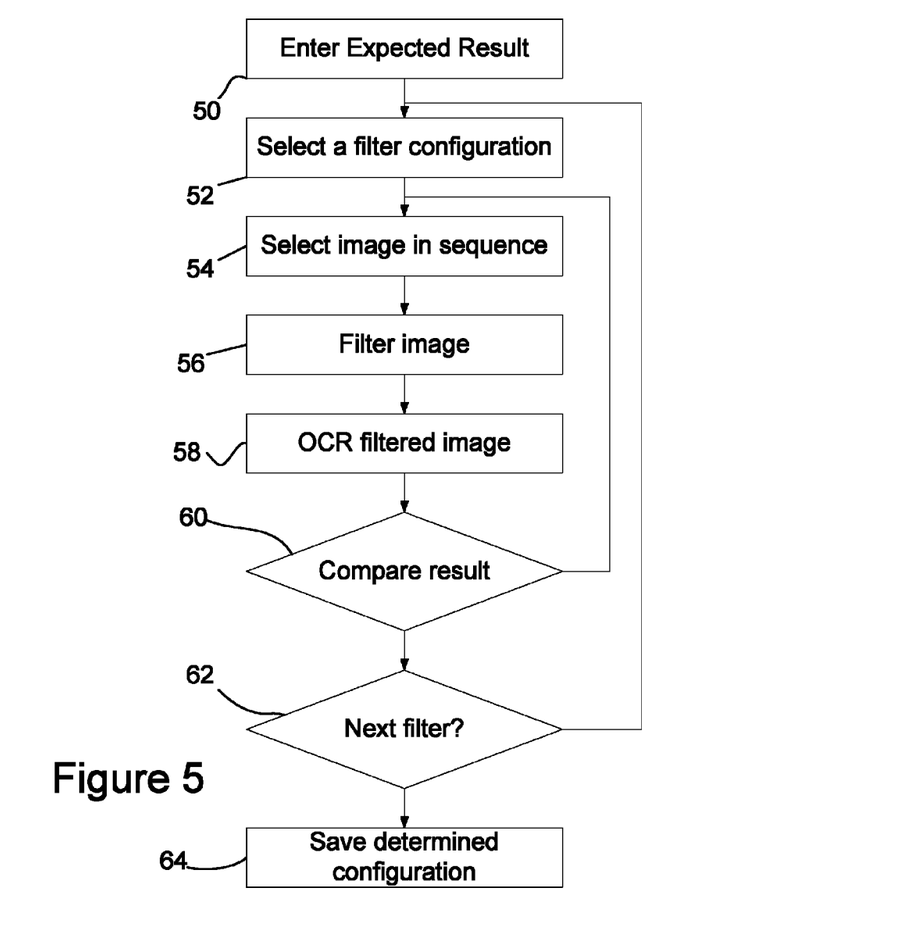
FIG. 5 illustrates a method for use in the arrangement of FIG. 4.

An exemplary method of selecting a configuration for the filter is shown in FIG. 5. In this exemplary method a user when configuring the test system, and as would be performed conventionally, may optionally identify a section of the screen (captured frame) to be analysed. The user specifies the expected result of the OCR process. The expected result is used to compares the output\OCR result of different filter configurations on a sequence of images to determine the performance of the different filter configurations. Each of the sequence of images contains substantially the same text content, i.e. a user visually sees the same text in each image of the sequence. For example, capturing 100 sequential frames of video having an OSD (On Screen Display) box shown would have the same text content visible to a user in the box in each of the frames on the screen. It will be appreciated however that a bit for bit comparison of the captured frames may well show them to be completely different for the reasons explained above including noise and possibly changing video content behind the OSD box. Suitably, a sequence of images are acquired as an initial step and the same sequence of images are used for comparing the performance of each filter configuration as the on-screen content may time out after a few seconds and an OSD disappear altogether. It will be appreciated that the sequence of images may be obtained as part of this process or they may have been obtained separately and stored.

A first filter configuration is selected 52 to be used to filter the selected 54 first image in the sequence. In the exemplary arrangement of FIG. 4, a series of filters are applied in a chain to the image. The first filter configuration may have a "null" setting for each filter which does not alter the image. Pictorially, in FIG. 4, this is represented by the setting "0" for a filter. This first filter configuration is used to set the filter and the first image is processed 56 by the filter using this configuration to provide a filtered image. The filtered image is then passed 58 through the OCR engine and the extracted text compared 60 with the expected result to determine the performance of the filter. It will be appreciated that the expected result need not be the entire of the extracted text but may in fact be a part of the text. For example, the person configuring the test may simply require the presence of a particular word in the extracted text rather than an exact match to the whole of the extracted text. A decision 62 is then made based on the outcome, where the filter performance is negative (i.e. text not recognised correctly), then the next filter configuration may be selected 52 and the test repeated again. Where the filter performance is determined to be positive, the test may be repeated for the next image in the sequence 54. Where the performance of a particular filter configuration is positive for all images in the sequence, then that configuration may be selected and stored 64 within the test routine for future use in a test process. At which point the configuration process for that aspect of the test is completed.

Alternatively, all of the filters configurations may be tested with the accuracy of each determined (i.e. in how many of the sequence of images did a filter result in the OCR producing the expected result) and the filter with the best accuracy selected.

Using this method, it is possible to choose a filter configuration which results in a correct match for the recognised text.

Whilst the above description refers to a sequence of images having substantially the same text content, it will be appreciated that the sequence may not be the actual sequence of frames and the training set (sequence of images) may be for example be captured frames chosen at intervals apart.

It will be appreciated that where the method is configured to select the first filter configuration that results in 100% accuracy that the filter configurations to be tested may be chosen in random order via traditional Monte Carlo methods, thus avoiding locally suboptimal blocks of filters if filters are tried in strict order of definition.

In another variation, it is also possible to generate the training set from the live signal, by capturing images "live" and accumulating these captures images on local storage. As long as each new image which arrives is recognised correctly, there is no need to re-train with all existing captured images (since these, by definition, will also have matched already). However once an image is captured which does not match the expected text, the captured images form the training set, and the algorithm starts the search for a better filter using the captured images. Where a further image does not match the expected result with a filter, it may be added to the training set until a suitable training set has been selected.

This training may be time limited (so that if all images match the expected text for a user-defined time period, the current best filter (configuration) is judged good enough and saved).

Given an image or set of images, it is possible for the system to automatically determine with a high degree of accuracy the expected text without user input. This is based on the observation that while incorrectly recognised text is typically random, the correctly recognised text is always the same. Therefore the system can "guess" that the string which appears most frequently in the recognition results is likely to be the text that the user wanted, and in the majority of cases it will be correct. Thus although the above method refers to the user entering an "expected" text result, it may not be necessary for the user to do this. In an alternative variation, the extracted text from a first image in a sequence may be employed as the "expected" result for the remainder of the images in the sequence, i.e. consistency of result is determined to equate to accuracy of result. It is possible of course that the OCR process may consistently fail to recognise the text correctly and that this alternative variation may not be appropriate.

Thus is it possible, without user intervention of any kind, to determine a set of image processing filters to apply to the captured image which will improve the accuracy of recognition.

It will be appreciated that whilst the present application has been described generally with respect to testing of STBs, it is equally applicable to testing other devices such as digital televisions, digital media players, DVD players and consumer devices such as mobile phones and PDA's. It will be appreciated that whilst digital televisions, digital media players and DVD players may have a remote control (e.g. IR) input for receiving test commands from the test system, other devices may require a different interface in the test system for sending test commands to the device under test.

Moreover, it will be appreciated that the presently described techniques may also be employed directly without a test configuration process. In particular, whilst the above method has been described with respect to using an initial configuration routine to establish\store the correct filter parameters for performing a particular test. The method may also be used in a live scenario to determine text content from a sequence of captured images. In such an arrangement, a sequence of captured frames (or parts thereof) may be passed through the configurable filter using a first filter setting and then through the OCR engine to provide a text result. Where the text result is consistent for all (or a significant proportion thereof) of the captured frames, the text result may be regarded as valid. Where the text is not consistent, the process may be repeated with a different filter configuration. This process may be repeated, varying the configuration each time, until a valid result is determined. It will be appreciated that this process may be of use generally to video captured from a device under test and may be employed generally to identify text in video content.

The invention claimed is:

1. A test system comprising:
a processor to:
obtain a video frame, comprising images in sequence, from a device under test;
select a filter configuration for at least one filter to test;
filter an image included in the images in sequence using the filter configuration to generate a filtered image;
extract text from the filtered image using an optical character recognition (OCR) engine;
determine a filter performance for the image based on comparing the text extracted from the filtered image to an expected result;
when the filter performance is a positive result, filter another image included in the images in sequence using the filter configuration;
when the filter performance is a negative result, repeatedly select a different filter configuration and filter the image using the different filter configuration until the positive result is determined; and
determine a suitable filter configuration when the filter performance for each image in the images in sequence is positive for a same filter configuration.

2. A test system according to claim 1, where the at least one filter is adapted to perform one or more of the following on the image:
selectively remove one or more color components
adjust image contrast;
invert colors;
blur;
sharpen the image; or
zoom the image so that the image is scaled up using interpolation.

3. A test system according to claim 1, where the at least one filter includes a plurality of different filters and the filter configuration indicates which of the plurality of different filters are to be used to filter the image.

4. A test system according to claim 1, where each of the at least one filter has a plurality of different filter settings, and
where the filter configuration defines the plurality of different filter settings to be employed for filtering the image.

5. A test system according to claim 1, where the expected result is determined by optical character recognition.

6. A test system according to claim 1, where the processor, when obtaining the video frame, is to:
capture the video frame using a frame grabber.

7. A test system according to claim 1, wherein the device under test is one of:
a set-top box;
a digital media player; or
a DVD player.

8. A test system according to claim 1, where the processor, when obtaining the video frame, is to:
acquire the video frame from display of the device under test using a camera.

9. A test system according to claim 8, where the device under test is one of:
a television;
a monitor;
a mobile telephone;
a personal digital assistant;
a digital camera; or
a laptop.

10. A method comprising:
providing, by a device, a sequence of images of substantially a same content;
selecting, by the device, a filter configuration for a filter for pre-processing an image of the sequence of images, from a plurality of available filter configurations;
pre-processing, by the device, the image using the filter configuration to generate a pre-processed image;
submitting, by the device, the pre-processed image through optical character recognition (OCR) to extract text from the pre-processed image;
determining, by the device, a filter performance for the image based on comparing the text extracted from the pre-processed image to an expected text;
when the filter performance is a positive result, pre-processing, by the device, another image included in the sequence of images using the filter configuration;
when the filter performance is a negative result, repeatedly selecting, by the device, a different filter configuration and pre-processing the image using the different filter configuration until the positive result is determined; and
determining, by the device, a suitable filter configuration when the filter performance for each image in the sequence of images is positive for a same filter configuration.

11. A method according to claim 10, further comprising:
pre-processing each successive image in the sequence of images and performing the OCR on each successive image that is pre-processed as long as the text extracted from a preceding image is determined to be correct.

12. A method according to claim 10, further comprising:
pre-processing each image in the sequence of images;
performing the OCR on all of the images in the sequence that are pre-processed; and
where determining the suitable filter configuration includes determining whether the filter configuration is suitable when the text extracted from each of the images in sequence is determined to be correct.

13. A method according to claim 10, where
the filter configuration comprises one or more filter types selected from a plurality of different filter types.

14. A method according to claim 10, where the filter configuration comprises one or more parameters for the filter.

15. A method according to claim 10, where the filter comprises a plurality of sub-filters which are applied in combination, and
the filter configuration comprises one or more parameters for each of the plurality of sub-filters.

16. A non-transitory computer-readable storage medium storing instructions, the instructions comprising:

one or more instructions which, when executed by a processor, cause the processor to:
  obtain a video frame, comprising images in sequence, from a device under test;
  select a filter configuration for at least one filter to test;
  filter an image included in the images in sequence using the filter configuration to generate a filtered image;
  extract text from the filtered image using an optical character recognition (OCR) engine;
  determine a filter performance for the image based on comparing the text extracted from the filtered image to an expected result;
  when the filter performance is a positive result, filter another image included in the images in sequence using the filter configuration;
  when the filter performance is a negative result, repeatedly select a different filter configuration and filter the image using the different filter configuration until the positive result is determined; and
  determine a suitable filter configuration when the filter performance for each image in the images in sequence is positive for a same filter configuration.

17. A non-transitory computer-readable storage medium according to claim 16, where the at least one filter is adapted to perform one or more of the following on the image:
  selectively remove one or more color components;
  adjust image contrast;
  invert colors;
  blur;
  sharpen the image; or
  zoom the image so that the image is scaled up using interpolation.

18. A non-transitory computer-readable storage medium according to claim 16, where the one or more instructions further cause the processor to:
  transmit commands to the device under test via a remote control interface.

19. A test system of claim 1, further comprising:
  a remote control interface to transmit commands to the device under test.

* * * * *